(12) United States Patent
Yamaguchi et al.

(10) Patent No.: US 6,304,862 B1
(45) Date of Patent: *Oct. 16, 2001

(54) EVOLUTIONARY CONTROLLING SYSTEM

(75) Inventors: Masashi Yamaguchi; Ichikai Kamihira, both of Iwata (JP)

(73) Assignee: Yamaha Hatsudoki Kabushiki Kaisha, Shizouka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/421,843

(22) Filed: Oct. 20, 1999

Related U.S. Application Data

(63) Continuation of application No. 08/939,132, filed on Sep. 29, 1997.

(30) Foreign Application Priority Data

Sep. 27, 1996 (JP) ...................................... 8-257000

(51) Int. Cl.[7] ..................................... G06F 15/18

(52) U.S. Cl. .................... 706/13; 706/14; 706/25
(58) Field of Search .................... 706/12, 13, 14, 706/23, 25

(56) References Cited

U.S. PATENT DOCUMENTS

| | | | |
|---|---|---|---|
| 4,697,242 | 9/1987 | Holland et al. | 706/13 |
| 4,907,170 | * 3/1990 | Bhattacharya | 706/14 |
| 4,935,877 | * 6/1990 | Koza | 706/13 |
| 5,041,976 | 8/1991 | Marko et al. | 701/71 |
| 5,136,686 | * 8/1992 | Koza | 706/13 |

(List continued on next page.)

OTHER PUBLICATIONS

John R. Koza, Genetic Programming 18, 94, 1992.*

D. Psaltis et al., A Multilayered Neural Network Controller, IEEE Control Systems Magazine, vol. 8, Issue 2, pp. 17–21, Apr. 1988.*

Crow et al, "The role of build in knowledge in adaptive interface system", ACM IUI, pp 97–104, Jul. 1992.*

Benyon et al, "Developing adaptive system to fit individual aptitudes", ACM IUI, pp 115–121, 7/92.*

Palaniswamy et al, "Scheduling time wrap processes using adaptive control techniques", ACM Proc. of winter simu. conf. pp 731–738, 1994.*

Smith et al, "Evaluation of an adaptive trafic control technique with underlying system changes", ACM Pro. of the winter simu. conf, pp 1124–1130, 1995.*

*Primary Examiner*—Mark R. Powell
*Assistant Examiner*—Anil Khatri
(74) *Attorney, Agent, or Firm*—Knobb, Martens, Olson & Bear, LLP

(57) ABSTRACT

An evolutionary control for a subject such as an engine installed in a vehicle is conducted by the steps of: selecting coefficients, as genes, affecting the control characteristics of the control system; creating plural control units as chromosomes, each being constituted by plural genes; expressing the genes of each chromosome as control characteristics by controlling the subject using the control system having the control characteristics; selecting at least one chromosome from the created chromosomes based on the control characteristics expressed by the genes in view of the user's preference; and causing the at least one chromosome to evolve using a genetic algorithm, thereby obtaining control characteristics suitable for the user. In this method, the characteristics of the product can effectively be adjusted after its purchase based on the user's preference.

7 Claims, 13 Drawing Sheets

U.S. PATENT DOCUMENTS

| | | | | |
|---|---|---|---|---|
| 5,140,530 | * | 8/1992 | Guha et al. | 706/13 |
| 5,148,513 | * | 9/1992 | Koza et al. | 706/13 |
| 5,255,345 | * | 10/1993 | Shaefer | 706/13 |
| 5,293,317 | * | 3/1994 | Adrain et al. | 701/115 |
| 5,361,628 | | 11/1994 | Marko et al. | 73/116 |
| 5,586,219 | * | 12/1996 | Yufik | 706/14 |
| 5,715,371 | * | 2/1998 | Ahamed et al. | 706/10 |
| 5,748,847 | * | 5/1998 | Lo | 706/14 |
| 5,794,224 | * | 8/1998 | Yufik | 706/14 |
| 5,987,444 | * | 11/1999 | Lo | 706/25 |
| 6,032,139 | | 2/2000 | Yamaguchi et al. | 706/13 |

\* cited by examiner

EVOLUTIONARY CONTROLLING SYSTEM

This is a continuation application of U.S. pat. application Ser. No. 08/939,132, filed Sep. 29, 1997.

BACKGROUND OF THE INVENTION

This invention relates to an evolutionary controlling system, and particularly to that for controlling characteristics of a subject in an evolutionary manner.

Heretofore, when a control system or control characteristics of a subject, such as vehicles and electrical appliances, is designed, imaginary users are selected, and the users' preferences and their using conditions are taken into consideration. The characteristics of the subject are determined in such a way as to adapt the subject to users in as broad a range as possible.

However, each individual user has a particular and unique personality, and thus, their preferences are diverse. Thus, there is a problem in that even if imaginary users are selected to develop and design a product for users by presuming the users' preference, it is impossible to satisfy all of the users of the product.

In order to solve the above problem, prior to purchase of a product, a prospective user is requested to determine whether or not the product is satisfactory to the user after checking the characteristics of the product in light of the user's preferences. However, it is troublesome for the user to check the characteristics of the product before purchase. Further, because a series of products are often operated or controlled by characteristics common in the products, although the design of the product is changed depending on the user's preferences, the user may not like other operational characteristics. Thus, although the design is appealing to some prospective users, the users may not purchase the product since the operational characteristics do not appeal to them. In other words, there is another problem in that the range of users is limited and depends on the operational characteristics.

An objective of the present invention is to provide an evolutionary control system to construct characteristics which can satisfy plural users.

SUMMARY OF THE INVENTION

One important aspect of the present invention attaining the above objective is a method for evolutionally controlling a subject based on a user's preference by using a control system having control characteristics, comprising the steps of: selecting coefficients, as genes, affecting the control characteristics of the control system; creating plural control units as chromosomes, each being constituted by plural genes; expressing the genes of each chromosome as control characteristics by controlling the subject using the control system having the control characteristics; selecting at least one chromosome from the created chromosomes based on the control characteristics expressed by the genes in view of the user's preference; and causing said at least one chromosome to evolve by repeating the creating step, the expressing step, and the selecting step, while causing cross-over and mutation of the genes, until the control system obtains control characteristics suitable for the user.

In the above, since plural chromosomes are created using coefficients affecting the control characteristics of the control system controlling the characteristics of a product to be controlled, and the chromosomes are subjected to selection based on the user's intention, thereby causing the chromosomes to undergo evolution using a genetic algorithm, the characteristics of the product can be changed after shipment in accordance with the user's intention, i.e., a customized or user-friendly product most suitable to each user can be supplied. Further, since the characteristics of a product to be controlled can be changed in accordance with the user's intention after its purchase, the user can give less weight to the initial characteristics of the product itself, and can select a product from a wide range at purchase. Further, the user can "train" a product to ease control of the subject particularly for the user and enjoy training and adapting the product to the user's preference. In addition, since a genetic algorithm is used as means for effecting evolution, evolution of the subject can efficiently be achieved.

In the above, the user's intention can easily be expressed as the user's instructions, and it is easy to determine the user's intention.

When the primary framework of selection is automatically conducted but the final selection is assigned to the user, the user's role of selection can be reduced while maintaining enjoyment of "training", i.e., adapting the subject to the user's preference. In the above, automatic selection can be conducted using an internal model formed by modeling behavior of the subject.

When a display indicating the characteristics of the subject is used, the user's role in the selection process can be reduced.

When the range of changing in behavioral characteristics of the subject is limited, in the case of adopting the control system to an engine for a vehicle, for example, the engine can effectively be prevented from performing beyond the environmental standard for exhaust gas even if the engine characteristics are changed, i.e., it is possible to prevent an change in behavioral characteristics beyond the necessary.

In the foregoing, the user can retrieve any preferable characteristics stored in a memory at any time, thereby quickly changing the behavioral characteristics of the subject depending on the feeling of the user or the environment.

When the subject to be controlled is an engine for a vehicle, the characteristics of the engine can be changed to suit the user's preferences, thereby obtaining characteristics of the engine most suitable to each individual user.

When the subject to be controlled is a suspension system or seat, the characteristics of the damper of the suspension system or seat can be changed to suit the user's preferences, thereby obtaining characteristics of the damper most suitable to each individual user.

When the subject to be controlled is an auxiliary power unit installed in a bicycle or a wheelchair, the characteristics of the auxiliary power unit (motor) can be changed to suit the user's preferences, thereby effecting assistance most customized to each individual user.

When the subject to be controlled is a personal robot, the behavioral characteristics of the robot can be changed to suit the user's preferences, thereby obtaining behavioral characteristics of the robot most suitable to each individual user.

In addition, when the control system comprises neural networks learning relationships among the control characteristics using coupling coefficients, and the coefficients used as the genes are the coupling coefficients, the creating step can readily be performed.

In the foregoing, the method in short comprises changing characteristics of the control system of the subject in accordance with the user's preference. In practice, the control system outputs a basic output to control the subject, and the changing step comprises the steps of: creating multiple control modules (chromosomes) for representing at least one factor to be controlled; selecting at least one control module most adaptable for a current operational state based on the user's preference; learning information from said at least one control module; compensating for the basic output based on the result of the selection and the learning; and controlling the subject using the output compensated for. In the method, as described later, an evolution-fitness hierarchy (layer), a learning hierarchy (layer), and a reflection hierarchy (layer) are preferably used.

The present invention can be applied not only to a method but also to a system. An appropriate system can be constructed accordingly. In addition, although the present invention can advantageously and preferably be applied to an engine, it can be applied to other machines as described above.

BRIEF DESCRIPTION OF THE DRAWINGS

FIG. 7(a) shows that torque is high at low and intermediate speeds, but torque and fuel efficiency are low at a high speed. FIG. 7(b) shows that fuel efficiency is very good, but torque is low at any speed. FIG. 7(c) shows that both torque and fuel efficiency are reasonably good.

DETAILED DESCRIPTION OF THE PREFERRED EMBODIMENT

The evolutionary control system of the present invention will be explained further with reference to an embodiment shown in the figures described below.

Outline of Evolutionary Control System

Figure 1:
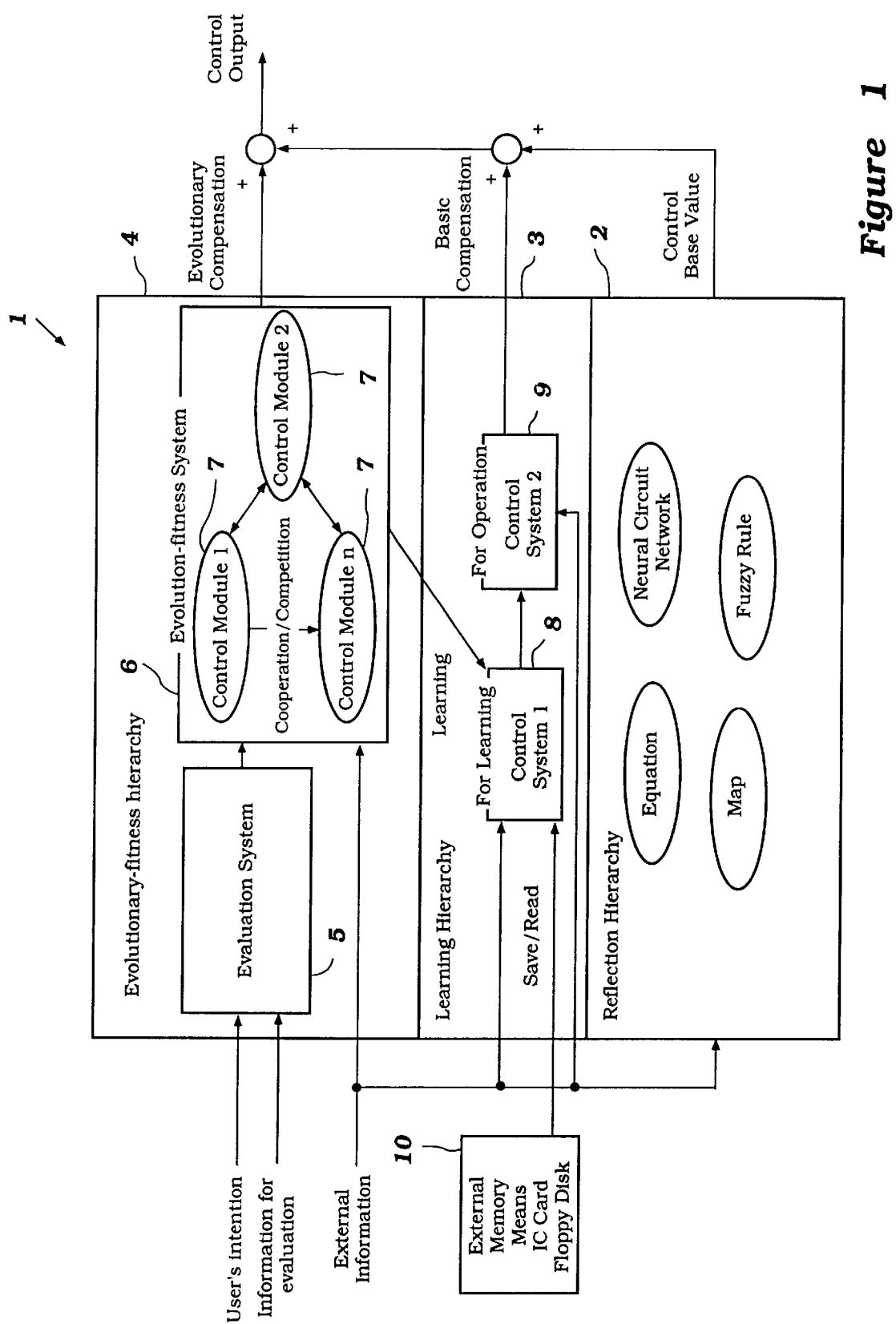
FIG. 1 is a block diagram showing the basic principle of an evolutionary control system according to the present invention.

FIG. 1 is a block diagram showing the basic principle of an evolutionary control system 1 according to the present invention. As shown in FIG. 1, the evolutionary control system 1 of this embodiment has three hierarchies, i.e., a reflection hierarchy 2 (base value output unit), a learning hierarchy 3 (learning unit), and an evolution-fitness hierarchy 4 (evolution unit), into which information related to the subject to be controlled, such as that related to a dynamic state, is input. Based on the information, a control base value is determined in the reflection hierarchy, and compensations for the control base value are determined in the learning hierarchy and in the evolution-fitness hierarchy. A final control output is determined based on the control base value and the compensations.

The functions of the reflection hierarchy, the learning hierarchy, and the evolution-fitness hierarchy in the evolutionary control system will be explained.

The reflection hierarchy is a hierarchy installing a relationship between information related to operational states of the subject to be controlled (hereinafter referred to as external information) and a control base value for the external information, in a control system such as in the form of equations, maps, fuzzy rules, a neural network, or subsumption architecture. When the external information is input thereinto, a control base value is determined for the external information input from the control system. The above subsumption architecture is known to be a behavioral artificial intelligence which conducts parallel processing.

The evolution-fitness hierarchy 4 is comprised of an evaluation system 5 and an evolution-fitness system 6 (genetic algorithm unit). The evaluation system is to input evaluation information (information related to characteristics of the subject) and information related to the user's intention, and based on the above information, the evolution-fitness system is changed in accordance with the user's intention. The evolution-fitness system 6 is provided with at least one control module 7 to compensate for the control base value to suit the user's intention. The at least one control module genetically evolves based on the determination in the evaluation system, and converts into a control module most suitable at the moment. Upon obtaining the most suitable control module, the control module is fixed in the evolutionary system which then outputs an evolutionary compensation which compensates for the control base value output from the reflection hierarchy. In the above, each control module is one unit having a control system, which conducts integrated control.

The learning hierarchy 3 is comprised of two control systems mutually switchable, one for learning 8 and the other for operation 9. While the control system for operation operates control, the control system for learning learns the relationship of input and output regarding the most suitably evolved control module in the evolution-fitness hierarchy. After completing the learning in the control system for learning, the control system operating control and the control system that has finished learning are switched over, whereby the control system after learning starts operating control using a control module obtained from the learning, whereas the control system previously operating control starts functioning as a control system for learning. The information related to the after-learning control-module in the learning hierarchy is readably saved in external memory means 10 such as an IC card and a floppy disk. The user can pull out the information related to the most suitable control module in the past from the external memory means, according to the user's need, and the user can thereby output a basic compensation from the learning hierarchy based on the information. Incidentally, the control system in the learning hierarchy is set so as to output zero at the beginning, i.e., control is conducted by the reflection hierarchy and the evolution-fitness hierarchy at the beginning.

The evolution-fitness hierarchy returns the output to zero after causing the learning hierarchy to learn information related to the most suitable control module. Thereafter, the evolution-fitness hierarchy operates in accordance with the user's intention.

According to the evolutionary control system described above, by the function of each hierarchy, the control output changes with time in accordance with the user's intention, and as a result, the characteristics of the subject to be controlled change with time in accordance wit the user's intention. In the present invention, the state, wherein the characteristics of the subject evolve to suit them to the characteristics of the user and/or the using conditions, is referred to as "training".

Control Flow of Evolutionary Control System

Figure 2:
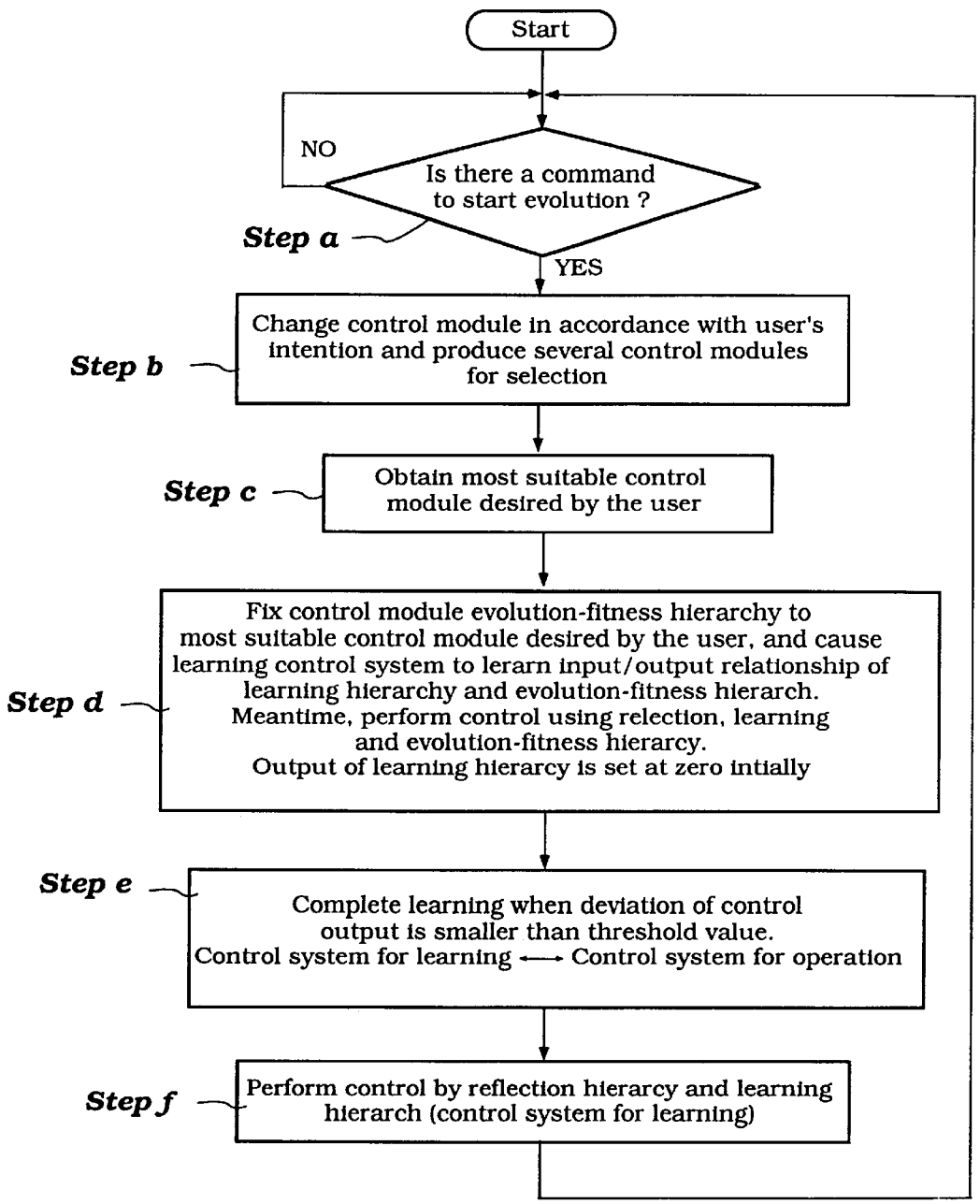
FIG. 2 is a flow chart of an evolutionary control system on a time basis, according to the present invention.

FIG. 2 is a flow chart of the evolutionary control system on a time basis.

In an initial state, it is determined whether or not a signal for initiating evolution is received from a user. When the signal to initiate evolution is received from the user, the following evolution-processing is activated (step a).

When receiving the signal of evolution-processing from the user, the signal is inputted into the evaluation system of the evolution-fitness hierarchy, and the evolution-fitness system receives an output from the evaluation system at a control module, wherein plural control modules for selection are generated from the control module in accordance with the signal from the user. These plural control modules are subjected to selection based on the user's intention, and then, based on the remaining control modules, evolved control modules for selection are generated using a genetic algorithm (step b).

By repeating step b in the evolution-fitness hierarchy, at least one control module most preferable which most conforms to the user's intention at the moment can be obtained (step c).

Upon obtaining the most preferable control module, the evolution-fitness hierarchy fixes the control module(s) to the most preferable control module, and outputs a compensation (hereinafter referred to as an evolution-compensation) using the fixed control module(s), thereby compensating for the control base value outputted from the reflection hierarchy. The learning hierarchy learns, in the control system for learning, the relationship of input and output in the evolution-fitness hierarchy wherein the control module(s) is fixed to the most preferable control module, in combination with the relationship of input and output in the control system for operation in the learning hierarchy. During the above time period, control over the subject is conducted by the reflection hierarchy, the control system for operation in the learning hierarchy, and the evolution-fitness hierarchy. In the above, the output from the learning hierarchy is set at zero (step d).

When the difference between the value, which is obtained by adding the output from the control system for learning in the learning hierarchy (hereinafter the output is referred to as "presumed compensation") to the control base value, and the value, which is the actual output (control base value+ compensation outputted from the control system of the learning hierarchy, hereinafter referred to as "basic compensation", +evolution compensation), is smaller than a predetermined threshold, the learning in the learning hierarchy is completed. The control system for learning and the control system for operation are then switched over, i.e., the previous control system for learning functions as a control system for operation while the previous control system for operation functions as a control system for learning (step e). In this way, control is conducted by the reflection hierarchy and the learning hierarchy (step f).

After the evolution-fitness hierarchy causes the learning hierarchy to learn information related to the most preferable control module, the output from the evolution-fitness hierarchy is fixed at zero, and thereafter, the evolution-fitness hierarchy stands by until receiving a signal to initiate evolution from the user (step a).

Evolutionary Control System Adapted to Engine of Vehicle

In an embodiment, the subject to be controlled is an engine installed in vehicles or vessels. However, in the evolutionary control system of the present invention, no restriction is imposed on the type of machine to be controlled, and as with the engine, a robot used in machine tools, a motor used in electrically-driven vehicles, or the like can be controlled by adopting the evolutionary control system based on the same principle as in the engine.

Figure 3:
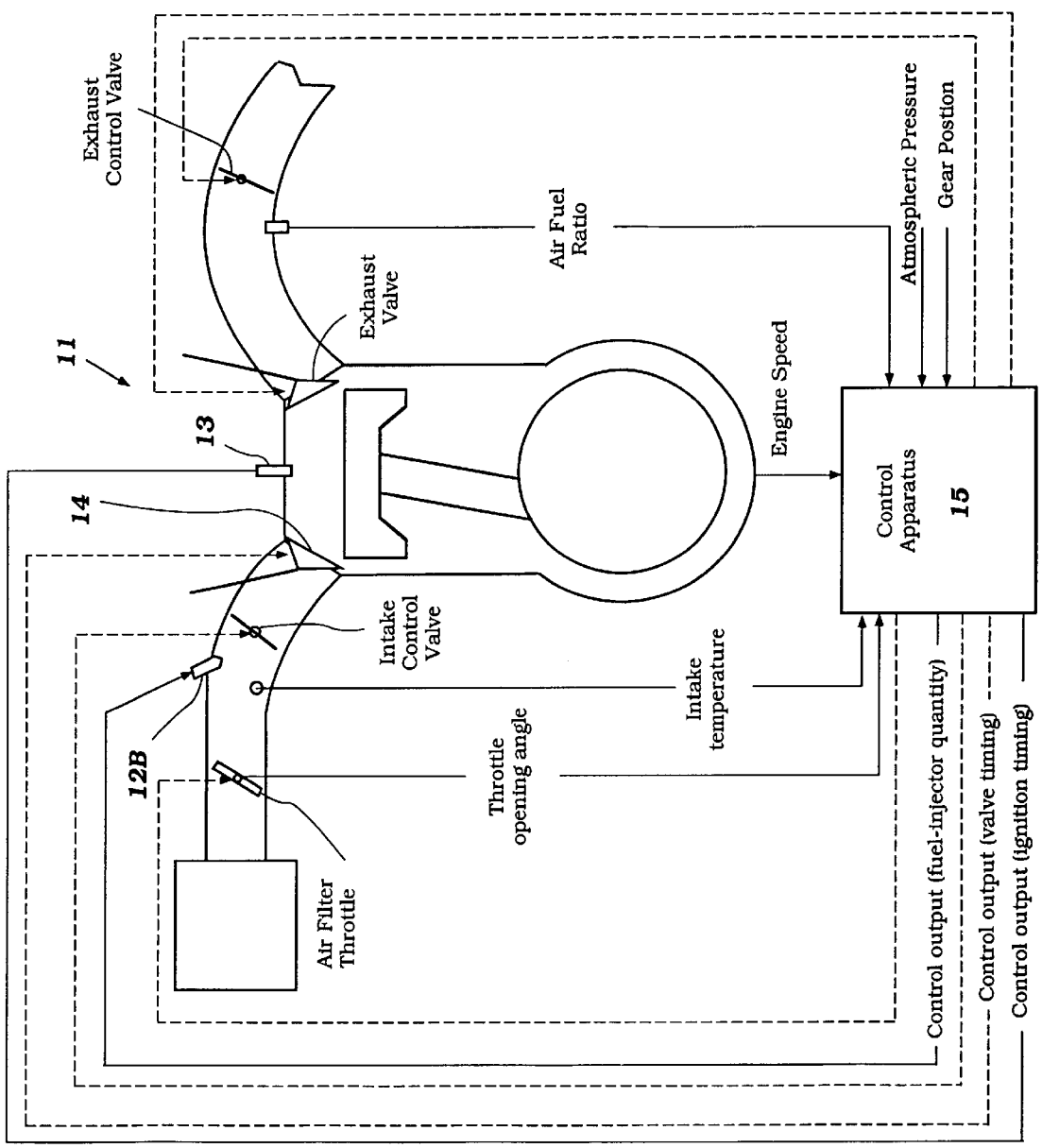
FIG. 3 is a schematic view showing the relationship between an engine and a control device performing the evolutionary control system of the present invention.

FIG. 3 is a schematic view showing the relationship between an engine 11 and a control device 15 performing the above-described evolutionary control system.

As shown in FIG. 3, the control device 15 controls the engine in such a way that fuel efficiency and acceleration performance are compatible with each other, by controlling the injection time period of an injector 12, the ignition timing of a ignition plug 13, and the valving timing of an intake valve 14, based on information input into the control device, such as the engine speed (r.p.m.), the degree of the throttle opening (angle), the atmospheric pressure, the intake temperature, the air-fuel ratio (A/F), and the driving speed.

Figure 4:
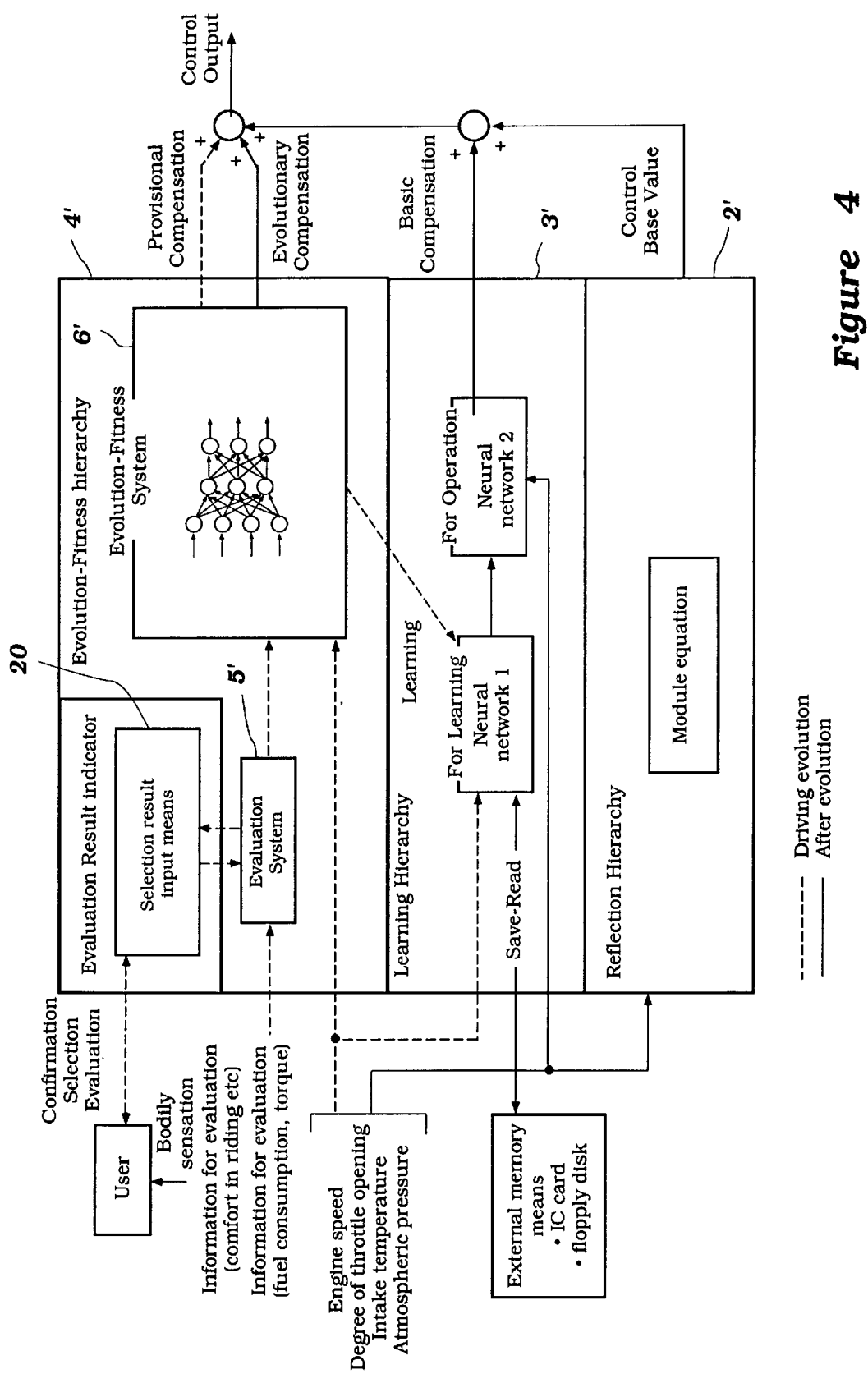
FIG. 4 is schematic block diagram of a control unit used in an engine control system according to the present invention.

FIG. 4 is a schematic block diagram of the control device 15.

The control device 15 is comprised of the reflection hierarchy 2' (base value output unit), the learning hierarchy 3' (learning unit), and the evolution-fitness hierarchy 4' (evolution unit) as described above.

Reflection Hierarchy Adapted to Engine Control

The reflection hierarchy receives signals such as those of the engine speed, the degree of the throttle opening, the intake temperature, and atmospheric pressure, and the reflection hierarchy determines and outputs a control base value that controls the injection time period of the injector 12, the ignition timing of the ignition plug 13, and the valving timing of the intake valve 14, using an equation formed by modeling numerical formulae obtained from the above input signals.

Evolution-fitness Hierarchy Adapted to Engine Control

The evolution-fitness hierarchy is comprised of an evaluation system 5' and an evolution-fitness system 6' (genetic algorithm unit).

Figure 5:
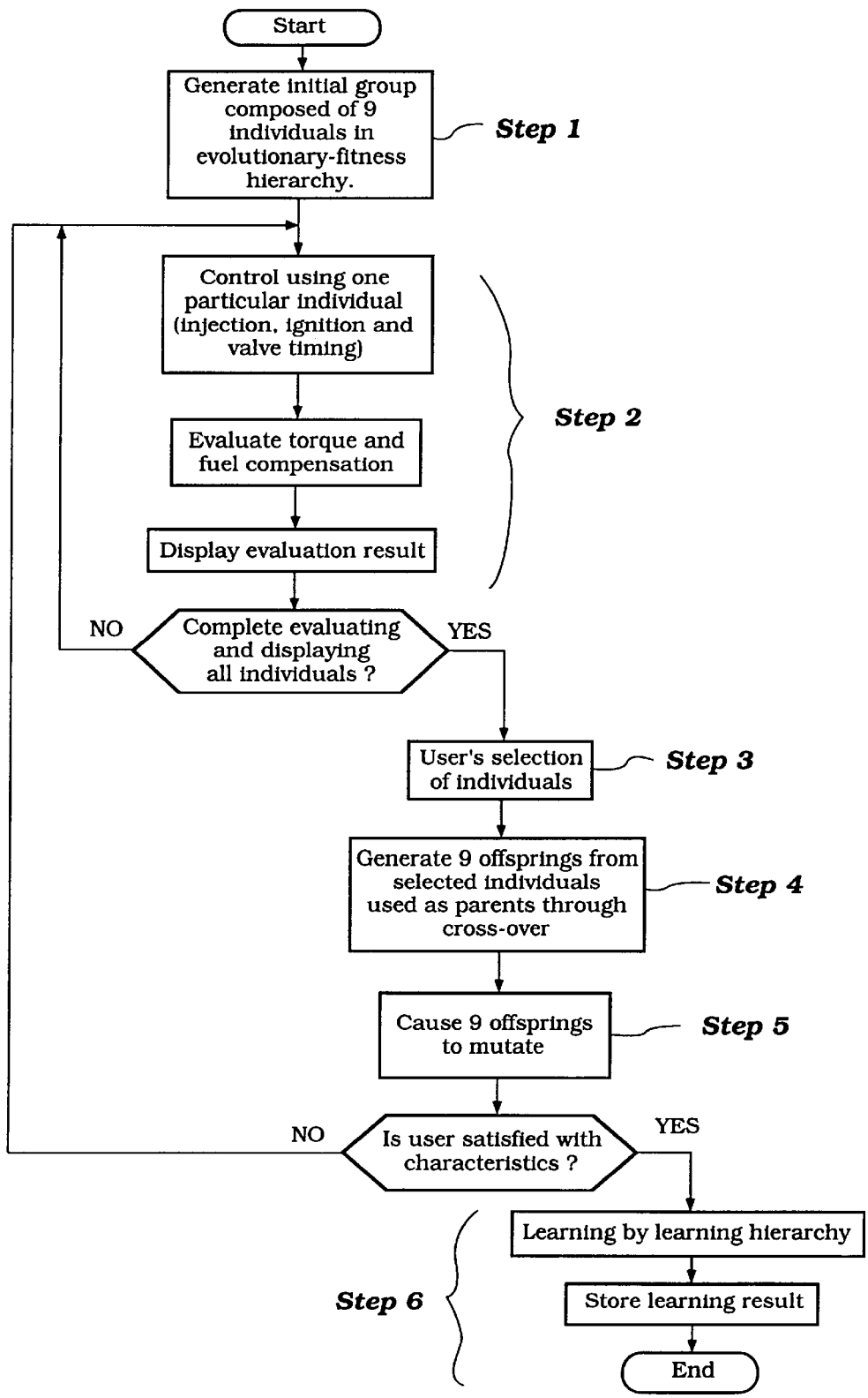
FIG. 5 is a flow chart showing a basic behavior of the evolution-fitness hierarchy according to the present invention.

FIG. 5 is a flow chart showing a basic behavior of the evolution-fitness hierarchy and the learning hierarchy. The basic behavior of the evolution-fitness hierarchy will be explained with reference to this chart.

Step 1: Formation of Initial Population First Generation)

Figure 6:
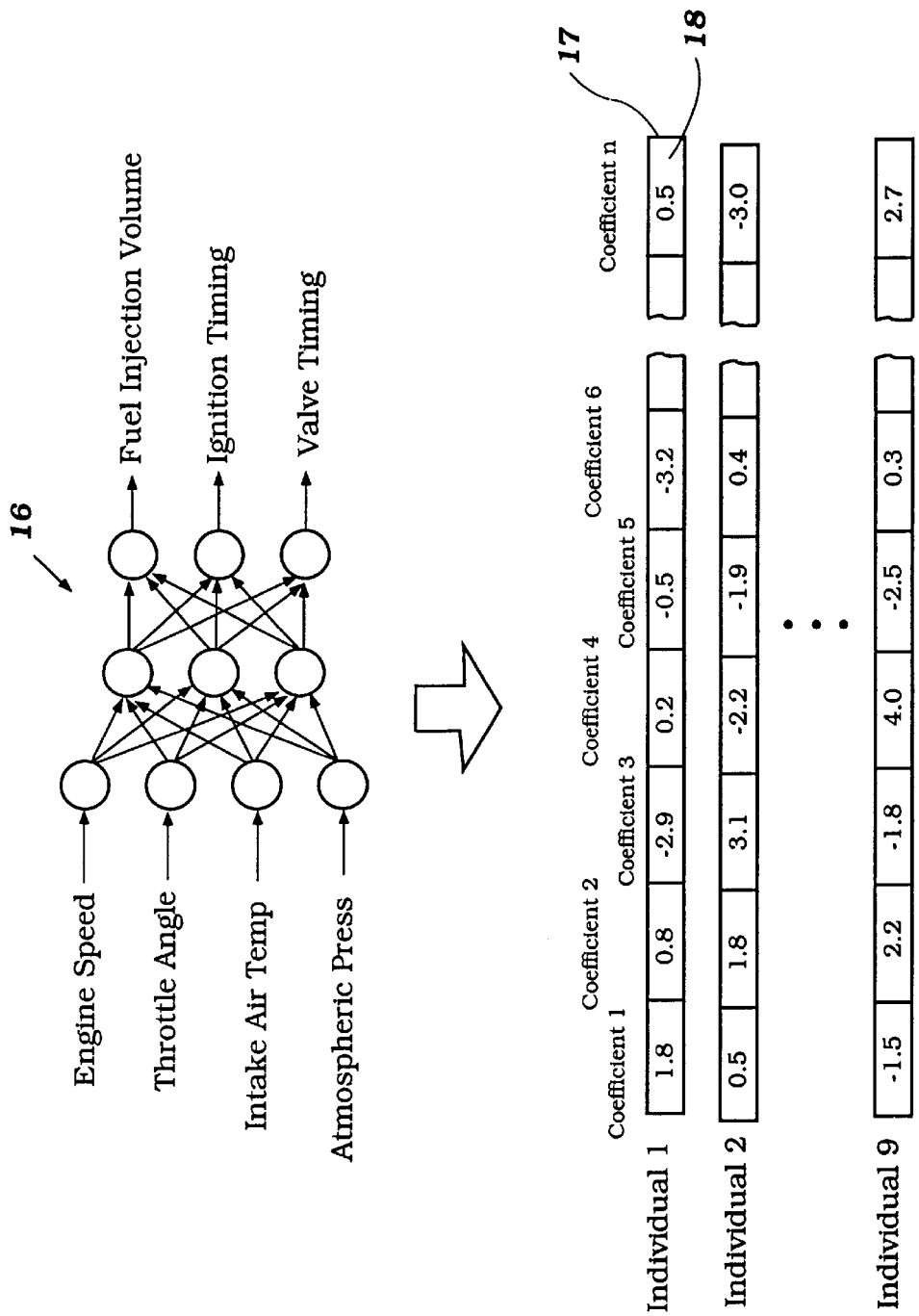
FIG. 6 is a schematic diagram showing an embodiment wherein a first generation is created, which is composed of multiple individuals (#1 to #9) encoded by coupling coefficients, used as genes, of the neural network which learns the relationship among various factors.
Figure 7A:
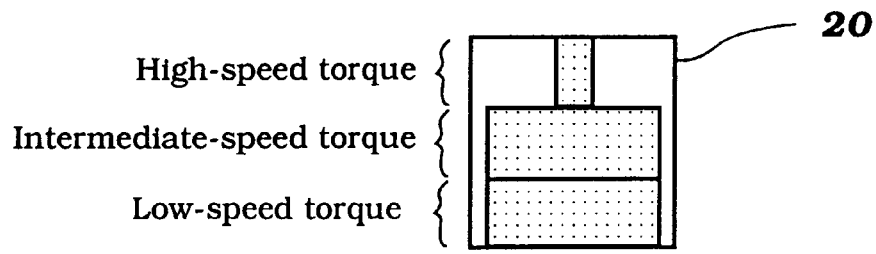
FIGS. 7(a)–7(c) illustrates one example of a manner visually expressing the characteristics of each individual (chromosome).
Figure 7B:
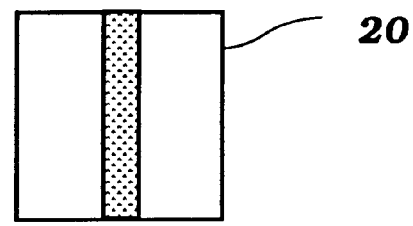
Figure 7C:
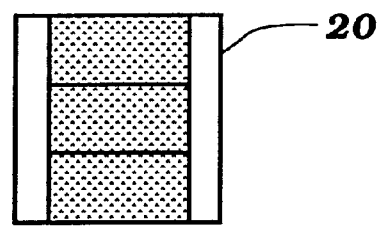

As shown in FIG. 6, the evolution-fitness hierarchy comprises at least one control module comprised of a hierarchical neural network 16 of a four-input/three-output type, which neural network receives as input the engine speed, the degree of the throttle opening, the intake temperature, and atmospheric pressure, and outputs a compensation for the fuel-injection quantity, the ignition timing, and the valving timing. When receiving a signal to initiate evolution from the user, a first generation is created, which is composed of multiple individuals (nine individuals #1 to #9 in this embodiment) encoded by coupling coefficients, used as genes 18 randomly assigned, of the neural network. In the above, one individual denotes one chromosome 17 contained in a genetic algorithm. Initial values of the genes, i.e., the coupling coefficients, of each individual are randomly set in a predetermined range (e.g., approximately −10 to 10). In the above, by creating one individual having a gene value (coupling coefficient value) of zero, it is possible to avoid abating, in the process of evolution, the performance characteristics lower than those before evolution. That is, in FIG. 7(a), torque is high at low and intermediate speeds and is low at high speeds, whereas fuel efficiency is low. In FIG. 7(b), fuel efficiency is very good, whereas torque is low at all speeds. In FIG. 7(c), both torque and fuel efficiency are reasonable.

Step 2: Evaluation of Fitness

The fuel-injection quantity, the ignition timing, and the timing of the intake valve are controlled based on the value which is the sum of the outputs from the reflection hierarchy and the learning hierarchy and the output from the evolution-fitness hierarchy obtained using the coupling coefficients of the first individual (#1) of the first generation (hereinafter this output is referred to as "provisional compensation"). Provisional compensation Y, i.e., the output from the evolution-fitness hierarchy, can be obtained by actually inputting the engine speed, the degree of the throttle opening, the intake temperature, and atmospheric pressure at the moment, into the neural network in which the coupling coefficients of individual #1 are used, to determine output x of the neural network, and then determining provisional compensation Y by linear transformation of the output x using equation (1). In the above, the input information such as the engine speed are used after being normalized.

$$Y = 2*Gx - G \quad (1)$$

wherein Y is a provisional compensation, x is an output from the neural network, and G is an output gain of the evolution-fitness hierarchy. By linear transformation of the output x of the neural network, the compensation outputted from the evolution-fitness hierarchy does not become extremely high, i.e., evolution progresses gradually as a whole. That is, an extreme change in engine behavior due to the evaluation or evolution is prevented.

Evaluation information such as the air-fuel ratio and the engine speed is then inputted into the evaluation system after traveling for a while with the provisional compensation Y (derived from individual #1) being kept outputted from the evolution-fitness hierarchy. In the evaluation system, based on this evaluation information, torque and fuel efficiency of the engine controlled using individual #1 are determined, and the properties regarding the torque and fuel efficiency of the individual are indicated on a display 20 located near e.g., the meter units, in a manner shown in FIG. 7. (a) to (c) in this figure illustrate one example of a manner expressing the evaluation result of the individual. In each figure, the width of the square indicates the magnitude of torque, the color (light and shade) indicates the fuel efficiency, and the height divided into three portions shows the speed. The torque increases proportionally to the width, the fuel efficiency improves proportionally to the depth of the color (light and shade), and the upper, middle, and lower portions of the speed indicate high, intermediate, and low, respectively.

Figure 8:
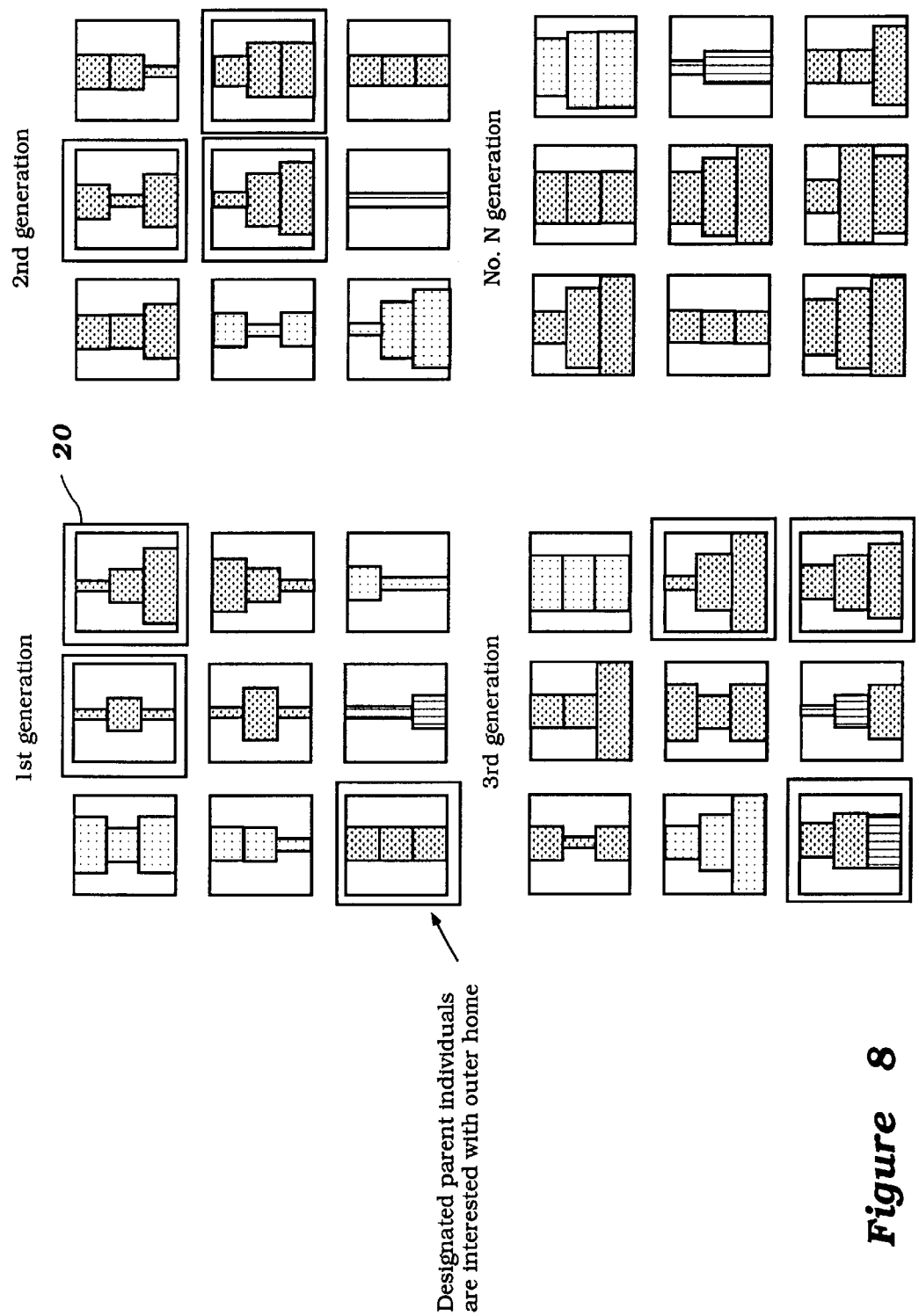
FIG. 8 illustrates one example of a manner visually expressing the characteristics of a population consisting of nine individuals (chromosomes).

The above evaluation of the individual is conducted on the population, i.e., all of the individuals of the fist generation, and each individual's evaluation is indicated simultaneously on one display, as shown in FIG. 8.

Step 3: Evaluation and Selection by User

After completion of display of the all nine individuals' properties (individuals #1 to #9), control is switched once to an evaluation mode. In this mode, the user selects an individual successively from the nine individuals, and the evolution-fitness hierarchy conducts control by fixing the neural network at the coupling coefficient of the individual selected by the user, i.e., based on the selected individual. Accordingly, the user evaluates the characteristics of each of the nine individuals indicated on the display, based on whether or not it is comfortable to ride in during actual driving, i.e., the user evaluates the fitness of each individual based on the feeling of comfort.

After completion of evaluation of fitness of each individual based on the torque and fuel efficiency visually indicated on the display, as well as the degree of comfort in riding, the control mode is changed to a selection mode, thereby conducting selection of individuals of the first generation. This selection can be conducted by, for example, touching the display with a finger to select several individuals having the desired characteristics from the individuals of the first generation, as shown in FIG. 8 (see the first generation in FIG. 8). The selected individuals are designated as parent individuals and allowed to survive, and the remaining individuals are deleted (the designated parent individuals are indicated with an outer frame in FIG. 8).

Step 4: Cross-over

Figure 9:
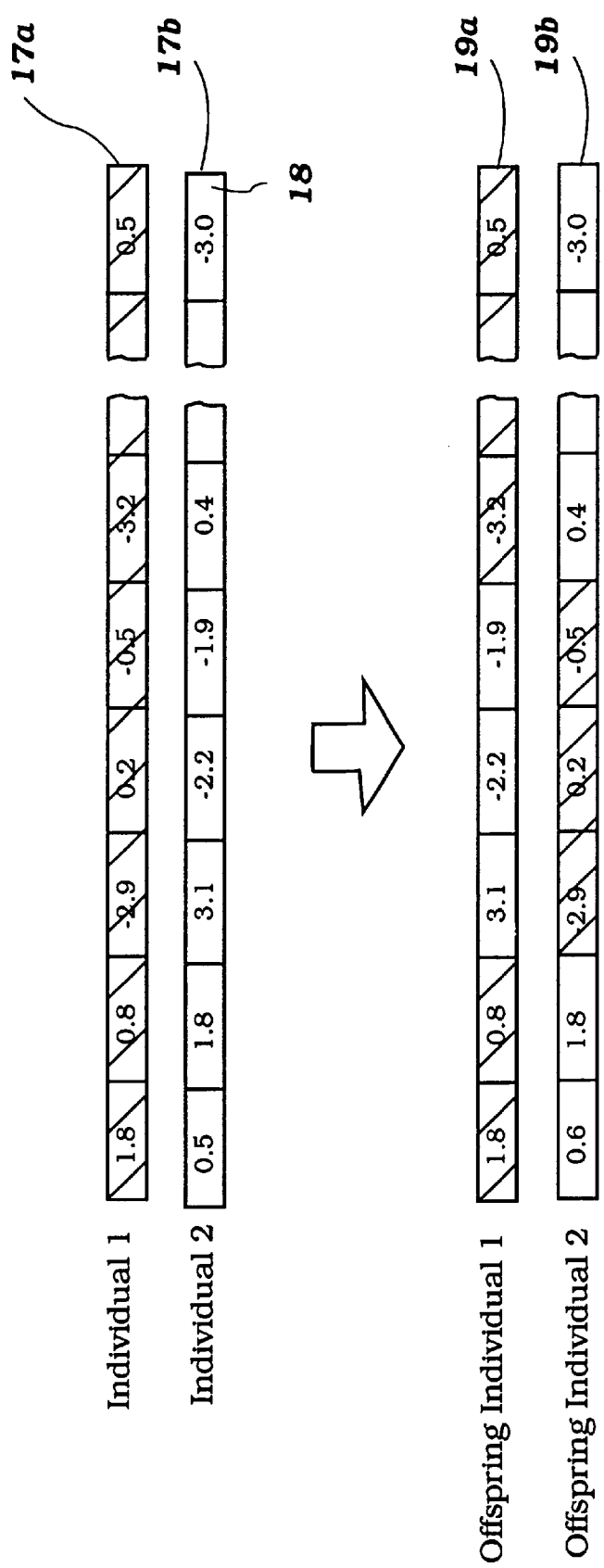
FIG. 9 illustrates the concept of cross-over between individuals (chromosomes).

After completion of selection of parent individuals by the user, two parent individuals 17a, 17b are selected therefrom, using random numbers. Accordingly, two offspring individuals (children) 19a, 19b are generated from the two parent individuals by performing cross-over processing (see FIG. 9). By repeating this step five times, nine individuals are generated (the tenth individual is discarded), i.e., a second generation is generated.

In the above, the cross-over between individuals may be single-point cross-over, double-point cross-over, or normal distribution cross-over.

The normal distribution cross-over is a method of creating offspring based on a rotation-symmetrical normal distribution with respect to an axis connecting the parents, using chromosomes expressed by the actual number (individuals). The standard deviation of the normal distribution are correlated with the distance between the parents in terms of the components in the direction of the main axis connecting the parents. Other components of the axis are made correlated with the distance between the line connecting the parents and a third parent sampled from the group. This cross-over method has an advantage that the characteristics of the parents are easily passed on to their offspring.

Step 5: Mutation

Figure 10:
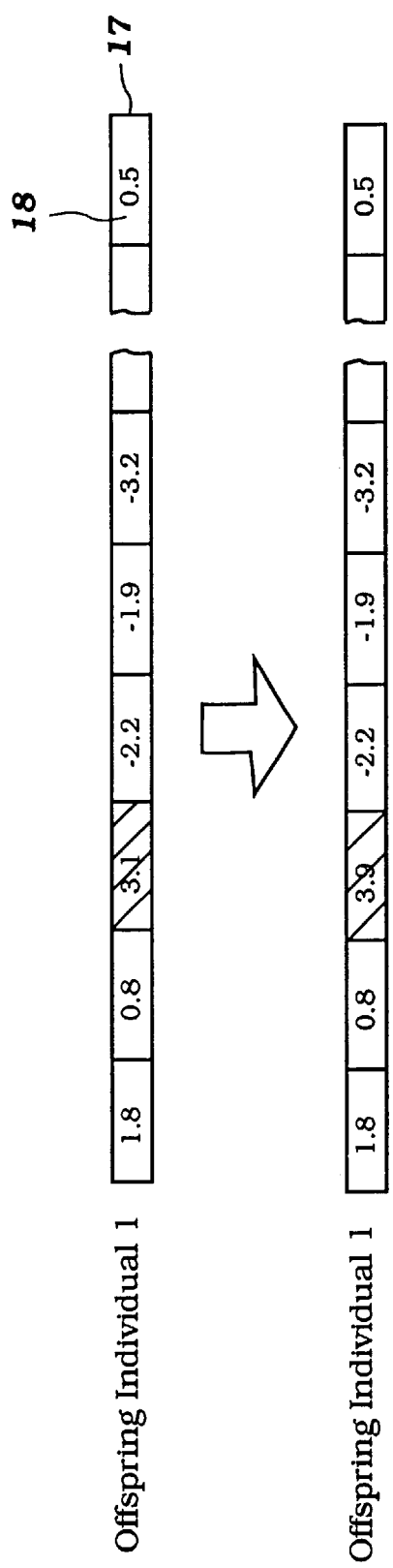
FIG. 10 illustrates the concept of mutation of an individual (chromosome).

After the creation of the nine offspring individuals, mutation of genes 18 is caused in the created nine offspring by randomly changing the gene value (the degree of coupling) at a given probability (see FIG. 10).

Step 6: Learning and Preservation (Learning Hierarchy)

Steps 2 to 6 are repeated until an individual, which has the characteristics satisfying the user, is selected. When the individual satisfying the user is obtained, the user terminates the evolution process by designating the individual as the most preferable individual. After selection of the most preferable individual, the evolution-fitness hierarchy fixes the coupling coefficients of the neural network at those of the most preferable individual. After the neural network is fixed at the most preferable individual, the evolution-fitness hierarchy conducts control based on the evolution compensation for, for example, the actual engine speed outputted from the neural network.

Upon activating control based on the evolution compensation by the evolution-fitness hierarchy, the neural network for learning of the learning hierarchy undergoes learning the relationship between the input and output of the evolution-fitness hierarchy, in combination with the relationship between the input and output of the neural network functioning as a neural network for operation. Meanwhile, the output of the evolution-fitness hierarchy is derived from the individual which maximizes the previous evaluation equation, and thus, the control pattern does not change with time.

Figure 11:
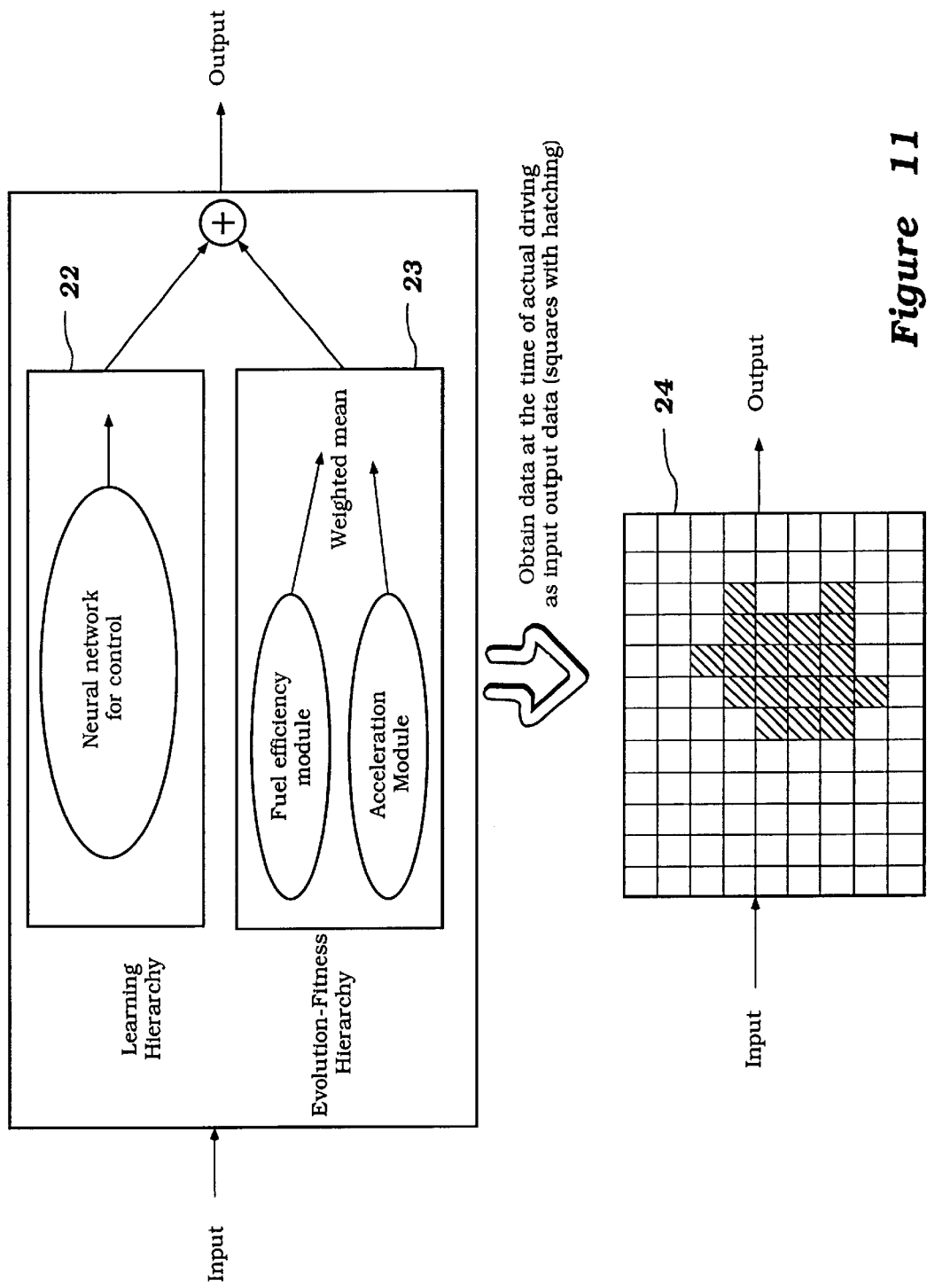
FIG. 11 is a diagram showing how to obtain input and output data to control the engine, which are the sum of actual data of operation, an evolutionary compensation, and a basic compensation.
Figure 12:
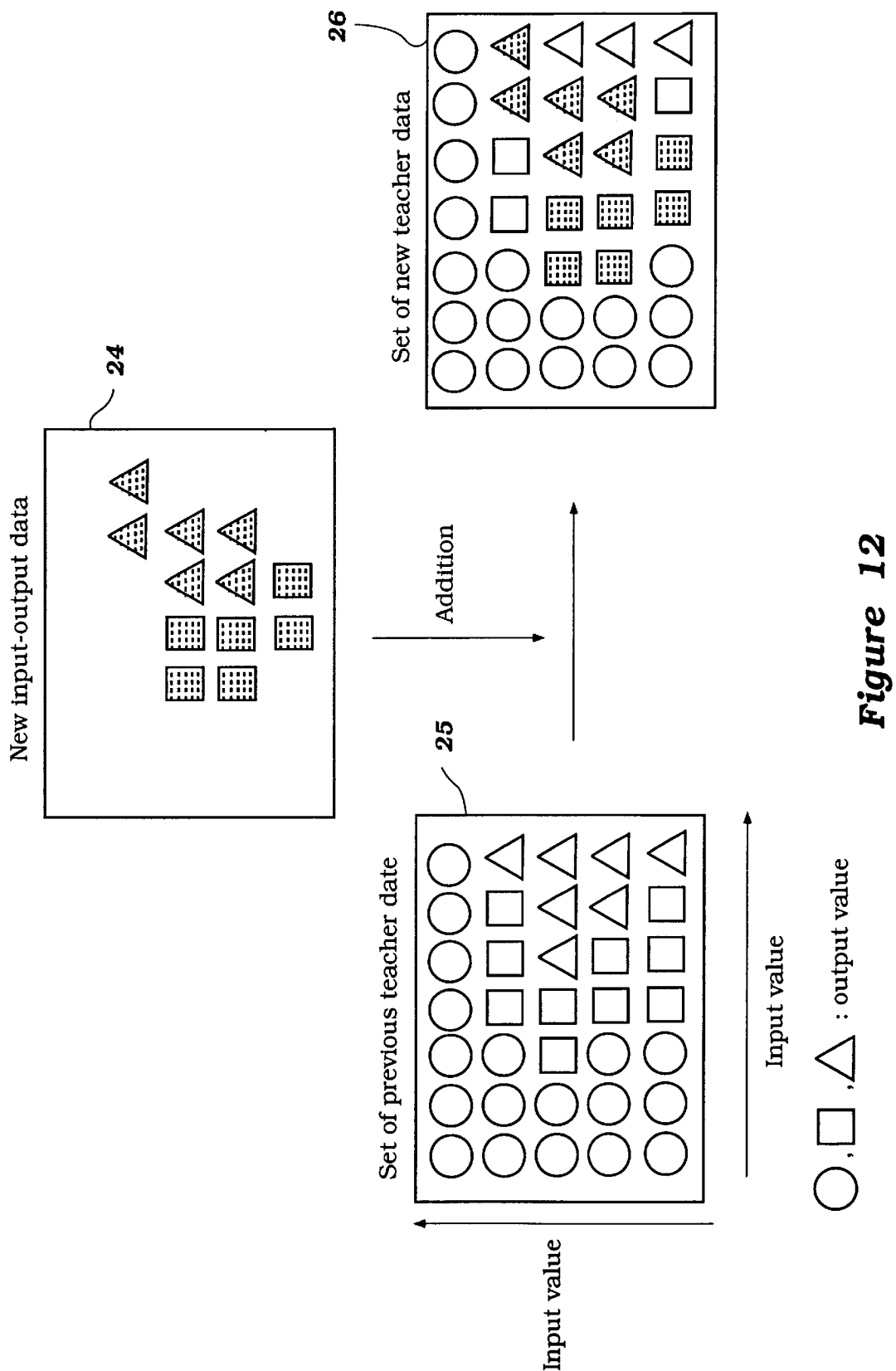
FIG. 12 is a diagram showing how to renew a set of teacher data, wherein old teacher data, whose Euclidean distance from the new data in a set of teacher data is less than a given value, are replaced with the new data.

The aforesaid learning, the input and output of the evolution-fitness hierarchy, and the input and output of the neural network for learning of the learning hierarchy are averaged at a given step width to use data of the input and output to renew a set of educator data (teacher data). For example, if the average engine speed is 5,000 r.p.m.'s, the average degree of the throttle opening is 20, the average intake temperature is 28° C., and the average atmospheric pressure is 1013 hPa, the sum of these values and the output from the evolution-fitness hierarchy 23 and the neural network for operation of the learning hierarchy 22 (i.e., the evolution compensation and the basic compensation), is used as input and output data 24 (see FIG. 11). The thus-obtained input and output data 24 are added to the previous teacher data 25 to obtain new teacher data 26. In the above, old teacher data, whose Euclidean distance from the new data in a set of teacher data is less than a given value, are deleted. This process is shown in FIG. 12. The initial values of a set of teacher data are set so as to output zero for all input data.

The learning hierarchy learns a coupling coefficient of the neural network for learning based on the renewed set of teacher data. The learning continues until a deviation between (a) a presumed control output, which is obtained from an output from the neural network for learning (i.e., presumed compensation) and a control base value from the reflection hierarchy, and (b) the actual control output, is less than a threshold. After completing the teaming, the neural network for learning is switched to that for operation, while the neural network previously for operation is switched to that for learning. After this process, the learning hierarchy determines the basic compensation using the newly-obtained neural network for operation, and actually outputs the result. When the learning hierarchy functions as above, the output from the evolution-adaptation hierarchy is zero, i.e., control is conducted by the learning hierarchy and the reflection hierarchy.

The initial value of the neural network for operation in the learning hierarchy is set so as to output zero. Accordingly, in an initial state, control can be conducted only by the reflection hierarchy and the evolution-fitness hierarchy.

The coupling coefficient of the neural network for operation which has completed learning can readably be saved in external memory means such as a floppy disk and an IC card. In this way, the characteristics of the most preferable individual once obtained by the evolution process can be resumed or retrieved. Accordingly, the user's preferred characteristics can immediately be realized in accordance with the driving area, the road conditions, or the feeling of the user at the moment.

In addition, the above-described evolution process of the control modules by using a genetic algorithm can be conducted as many times as the user wishes, simply by inputting a signal to initiate evolution.

Figure 13:
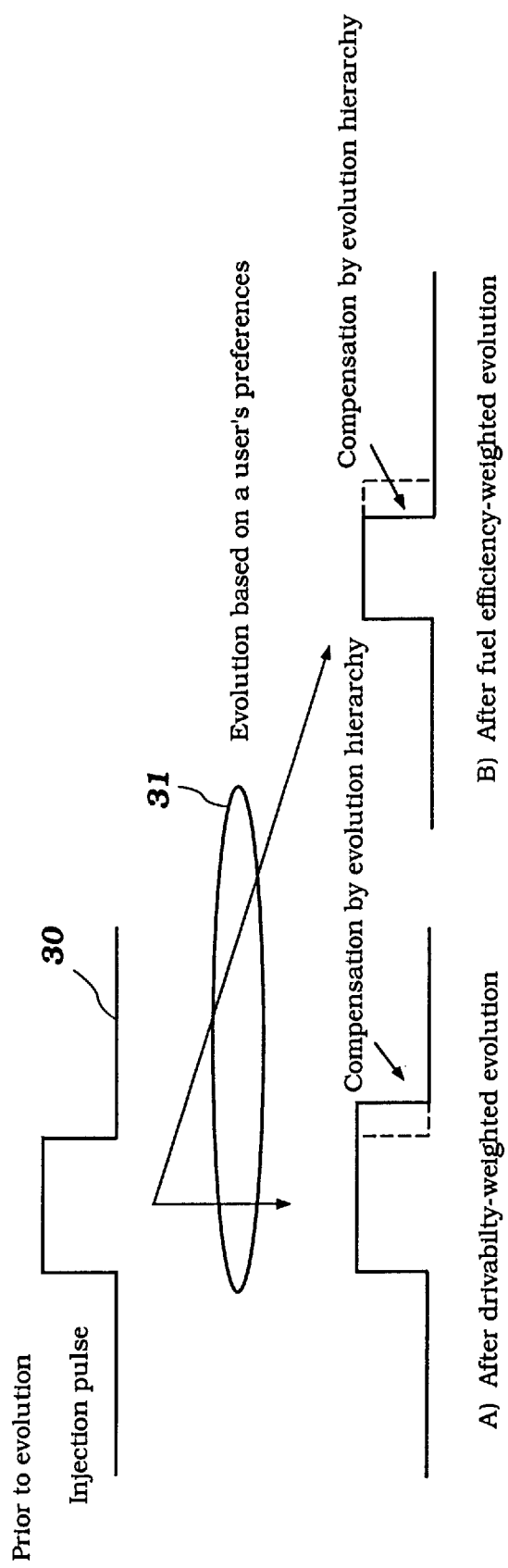
FIG. 13 illustrates a change in the control over injection impulses for an injector, for example, before and after the evolution process according to the present invention.

FIG. 13 illustrates the change in the control over injection impulses 30 for an injector, for example, before and after the above evolution process 31. As shown in this figure, by the above evolution process, the engine is "trained" to suit the user's preference, e.g., a fuel efficiency-weighted type ((B), injection time is adjusted to achieve economical air-fuel ratio) or a low-speed torque-weighted type ((A), injection time is adjusted to achieve powerful air-fuel ratio).

Overall Features and Other Features

In the above embodiment, the system is designed so that all of the operations of selection of individuals are controlled by the user. However, various systems are feasible without complication. For example, first, the user instructs the direction of evolution (such as a fuel efficiency-weighted type or a low-speed torque-weighted type), and using the instructions as an evaluation equation of selection, a first-stage selection can automatically be conducted, and the user simply makes the final selection. By conducting control as above, the user's role to train the subject can be reduced while maintaining enjoyment of training and adapting the subject to the user's preference.

In the above, the evaluation at the first-stage selection can be conducted using an engine model constituting the reflection hierarchy, instead of the actual engine performance.

In the aforesaid example, the subject of the evolutionary control system is an engine for a vehicle. However, the subject of the evolutionary control system is not limited to an engine, and can be any given control such as control over the characteristics of a damper of a suspension or sheet for a vehicle, or control over the assist characteristics of an auxiliary drive of a bicycle or wheelchair equipped with an electrical motor or engine, or control over the behavioral characteristics of a personal robot (brisk behavior or tranquil behavior).

Further, in the aforesaid example, as control output, the injection time period, the ignition timing, and the timing of intake valving are used. However, in addition to the above, control output for controlling an engine can be the degree of the electric throttle opening, the timing of activation of intake and exhaust valves, the degree of valve lift, the timing of activation of intake and exhaust control valves, or the like (see FIG. 3). In the above, the intake control valve is a valve provided in an intake pipe in order to control a tumbler and swirl. The exhaust control valve is a valve provided in an exhaust pipe in order to control exhaust pulsation.

Further, in the aforesaid example, the learning hierarchy is comprised of a hierarchical neural network. However, the basic structure of the control system of the learning hierarchy is not limited to the above, and for example, a CMAC (Cerebellar Model Arithmetic Computer) can be used. The CMAC is excellent in terms of additional learning and the high speed of learning, as compared with the hierarchical neural network.

It will be understood by those of skill in the art that numerous variations and modifications can be made without departing from the spirit of the present invention. Therefore, it should be clearly understood that the forms of the present invention are illustrative only and are not intended to limit the scope of the present invention.

What is claimed is:

1. A method of real-time adaptation of a control unit of a machine to a user who manipulates the machine, the output of which machine is recognized by a user, said control unit being programmed to formulate multiple sets of coefficients under predetermined rules, each set of coefficients being assigned to a different control module, each control module outputting an operation signal to operate the machine when receiving a pre-selected signal, the coefficients regulating the input-output relationship of each control module, said machine being provided with an indicator which indexes and displays to the user output of the machine indicative of the control module in use and which allows the user to select or not select the control module as an adaptive control module based on the user's preference for the output of the machine, said method comprising the steps of:

(a) formulating multiple sets of coefficients for control modules;

(b) inputting to each control module a pre-selected signal to output an operation signal from the control module into the machine;

(c) while the machine is in operation, displaying to the user via the indicator the indexed output of the machine indicative of the control module in use;

(d) selecting, by the user using the indicator, at least one control module from the multiple control modules, based on the user's preference for output of the machine corresponding to each control module;

(e) formulating subsequent sets of coefficients for control modules based on the coefficients of the selected control module(s), if the selected control module is not final;

(f) repeating steps (b) through (e) until the machine is operated adaptively to the user on a real-time basis, using the last selected control module.

2. The method according to claim 1, wherein the input-output relationship of each control module is regulated by parameters, and in step (e), the multiple control modules are formulated by evolutionary computing wherein the parameters are used as genes.

3. The method according to claim 2, wherein the parameters' values are restricted to prevent sudden changes in the output of the machine.

4. The method according to claim 1, wherein steps (a) through (f) are repeated periodically while the machine is in operation.

5. The method according to claim 1, wherein steps (a) through (f) are repeated on the user's request.

6. The method according to claim 1, wherein information on the finally selected control module is saved in a memory and retrieved on the user's request.

7. The method according to claim 1, wherein the indicator comprises a display monitor with selection buttons which allows the user to input the user's evaluation of the output of the machine.

* * * * *